United States Patent [19]
Elliott et al.

[11] Patent Number: 5,894,393
[45] Date of Patent: Apr. 13, 1999

[54] AIRCRAFT GROUND POWER LOSS OF NEUTRAL AND OVER-VOLTAGE DETECTOR

[75] Inventors: Stephen H. Elliott, Bradenton; John A. Miller, Tampa; Norman Kosciusko, St. Petersburg Beach, all of Fla.

[73] Assignee: Trilectron Industies, Inc., Palmetto, Fla.

[21] Appl. No.: 08/989,256

[22] Filed: Dec. 12, 1997

[51] Int. Cl.⁶ .................................................. H02H 3/00
[52] U.S. Cl. ............................ 361/42; 361/48; 361/115
[58] Field of Search .............................. 361/42, 45, 48, 361/115, 93, 91, 62, 64, 66, 44

[56] References Cited

U.S. PATENT DOCUMENTS 4,153,923  5/1979  Graf .................................... 361/48

Primary Examiner—Jeffrey Gaffin
Assistant Examiner—Stephen Jackson
Attorney, Agent, or Firm—Darby & Darby

[57] ABSTRACT

A ground fault and over-voltage detector and method is disclosed for sensing a loss of neutral continuity between the respective neutral conductors of a ground power unit and an aircraft power system coupled to the unit. The detector includes a feedback path for carrying a feedback signal from the aircraft to the ground power unit. The feedback signal comprises a voltage signal referenced to the aircraft neutral and includes a ground fault voltage component. The detector further includes a signal conditioner disposed in the ground power unit for receiving the feedback signal and generating a signal representative of the magnitude of the ground fault voltage component. A comparator connected to the output of the signal conditioner contrasts the ground fault voltage magnitude signal to a predetermined threshold and a cutoff mechanism responsive to the comparator, when the ground fault voltage is greater than the threshold, to interrupt ground power from the ground power unit to the aircraft.

25 Claims, 3 Drawing Sheets

AIRCRAFT GROUND POWER LOSS OF NEUTRAL AND OVER-VOLTAGE DETECTOR

FIELD OF THE INVENTION

The invention relates to ground fault and over-voltage protection and more particularly an apparatus and method for detecting ground fault and over-voltage conditions during ground power servicing of an aircraft.

BACKGROUND OF THE INVENTION

Electric power distribution in a passenger aircraft is often very complex, requiring both alternating current (AC) and direct current (DC) power at varying levels. This power is generated during flight as the product of one or more generators tied to the output of the aircraft propulsion system. On the ground, however, the aircraft electrical requirements are supported by ground power units that couple to the aircraft electrical system.

A typical aircraft electrical distribution system includes both three-phase and single-phase loads. The system circuitry usually omits any safety ground conductor in order to save weight in the aircraft. Additionally, the skin of the aircraft often serves as part of the aircraft's neutral voltage reference point. During ground power servicing, the aircraft's neutral voltage is carried through a ground power harness and tied to the ground power unit's neutral point. The neutral conductor, between the aircraft neutral and the GPU neutral, carries any current caused by imbalance on the single-phase aircraft loads.

Unfortunately, continuity between the aircraft and GPU neutral conductors occasionally breaks, through wire fatigue or the like. As a result, the aircraft loses the neutral reference point for all AC loads that use a neutral reference. Consequently, without a neutral connection, any wye-connected loads often become unbalanced. In essence, the neutral point and the phase-to-neutral voltages move around according to the load impedances.

For aircraft power systems faced with a broken neutral conductor, the unbalanced condition will exist for virtually any load condition. Further, if the coupled ground power unit does not provide over-voltage protection circuitry, unacceptably high AC supply voltage may be applied to some of the phases, subjecting sensitive electronic instrumentation to potentially damaging voltage levels. Moreover, passengers and personnel loading and exiting the aircraft may experience an electrical shock should both the earth (GPU neutral) and the aircraft skin (aircraft neutral) be touched simultaneously due to the potential difference generated between the respective neutral points on account of the broken neutral connection.

To protect individuals and sensitive electronic equipment from the hazards often associated with ground fault and over-voltage conditions, those skilled in the art have devised many different forms of ground fault protection. Generally, the systems monitor the magnitude of the current flowing from main conductors to earth instead of returning back through the neutral or other phase conductor. Once the monitored current exceeds a threshold level, power to the main conductors is interrupted.

One general proposal for carrying out ground fault protection involves placing a current transformer over all of the main conductors except the safety ground wire. The transformer includes a burden resistor to detect current proportional to the ground fault current. During normal operation, the instantaneous sum of the currents through the main conductors is zero. In a ground fault situation, current flows back through a ground connection which does not cancel the current flowing out. As a result, a voltage is developed across the transformer burden resistor that is indicative of the ground fault current magnitude. If the fault current exceeds a predetermined threshold, such as approximately 0.005 amperes, a safety disconnect is tripped, shutting off power to the circuit. This circuit is typical of a conventional ground fault circuit interrupter (GFCI or GFI) commonly used for residential outlet applications.

A second method of effecting ground fault protection is similar to the previously described technique, but involves inserting a current transformer over the ground wire. Current flowing from the electrical unit back through ground can be detected, and if the detected current exceeds thresholds of between 5 to 1000 amperes, to cause a power interruption. This type of circuit is commonly implemented in high power industrial applications carried out in controlled environments with highly trained personnel.

While the above-described transformer techniques are believed adequate for their specifically designed applications, several problems can occur if implemented in an aircraft ground power system. For example, the conventional current transformer systems often cannot detect the high voltage on an aircraft in most situations. This is because large ground currents (measured by the transformers) flow only if a skin-to-ground connection is made. If no skin-to-ground connection is established, then the high phase voltages can still remain unseen on the aircraft electrical system with the potentially "shocking" difference in potential existing between the aircraft and the bridge.

Other techniques of attempting ground fault protection for aircraft ground power systems include building an over-voltage circuit into the GPU itself to detect ground faults at the GPU. Unfortunately, this method fails to detect any problem resulting from a broken neutral connection because the voltage sensed at the GPU is sampled before the broken neutral connection. Moreover, attempts at remote voltage sensing, wherein the voltages on the three-phase conductors at the aircraft are brought back through the GPU harness to the GPU, have been attempted. However, this method ignores the neutral connection and the problems associated with a broken neutral conductor.

What is needed and heretofore unavailable is a ground fault and over-voltage detector and method for detecting the loss of a neutral connection between an aircraft power system and a ground power unit. The detector and method of the present invention solves this problem.

SUMMARY OF THE INVENTION

The detector and method of the present invention offer the capability of economically sensing the loss of a neutral connection between an aircraft power system and a ground power unit. By detecting the loss of neutral in a timely manner, critical electronic instrumentation is protected from unexpected voltage imbalances that undesirably cause high voltage transients. By eliminating such exposure, costly inspections are minimized and instrumentation accuracy and precision is maximized. Moreover, sensing a loss of neutral also avoids subjecting passengers and personnel to unexpected shocks caused by potential differences between respective neutral voltage references.

To realize the advantages above, the invention according to one embodiment comprises a ground fault and over-voltage detector and method for sensing a loss of neutral continuity between the respective neutral conductors of a ground power unit and an aircraft power system coupled to the unit. The detector includes a feedback path for carrying a feedback signal from the aircraft to the ground power unit. The feedback signal comprises a voltage signal referenced to the aircraft neutral and includes a ground fault voltage component. The detector further includes a signal conditioner disposed in the ground power unit for receiving the feedback signal and generating a signal representative of the magnitude of the ground fault voltage component. A comparator is connected to the output of the signal conditioner for contrasting the ground fault voltage magnitude signal against a predetermined threshold. A cutoff mechanism is responsive to the comparator, when the ground fault voltage is greater than the threshold, to interrupt ground power from the ground power unit to the aircraft.

In another form, the invention comprises a ground power system for servicing a stationary aircraft. The system includes an aircraft power distribution unit having respective loads referenced to a neutral voltage and including a feedback path for transmitting a feedback signal referenced to the neutral voltage. The feedback signal includes a ground fault voltage component. The system also includes a ground power unit having a ground fault and over-voltage detector. The detector includes a signal conditioner disposed in the ground power unit for receiving the feedback signal and generating a signal representative of the magnitude of the ground fault voltage component. A comparator is connected to the output of the signal conditioner for contrasting the ground fault voltage magnitude signal against a predetermined threshold. A cutoff mechanism responsive to the comparator is operative, when the ground fault voltage is greater than the threshold, to interrupt ground power from the ground power unit to the aircraft.

In yet another form, the invention comprises a method of detecting discontinuity between respective aircraft and ground power neutral reference points during ground power servicing of a stationary aircraft. The method includes the steps of first generating a predetermined feedback voltage at the aircraft. The feedback voltage is referenced to the aircraft neutral reference point and includes a ground fault voltage component indicative of the voltage between the respective discontinuous neutral reference points. The method proceeds by sensing the feedback voltage at the ground power unit and comparing the magnitude of the fault component to a predetermined threshold magnitude. The method concludes with the step of interrupting, when the magnitude of the ground fault component is greater than the predetermined threshold, the servicing of power to the aircraft.

BRIEF DESCRIPTION OF THE DRAWINGS

Other features and advantages of the present invention will be apparent from the following detailed description when read in conjunction with the accompanying drawings, wherein.

DETAILED DESCRIPTION OF THE INVENTION

The ground fault and over-voltage detector of the present invention enables a ground power unit (GPU) to sense if a broken neutral connection exists between the GPU and an aircraft power system. The neutral serves as an electrical reference for the entire system and balances the power consumption, or loading, of the respective electrically powered devices onboard the aircraft. The detector generates, at the aircraft, a feedback signal for sensing, at the ground power unit, that includes a signal component indicative of a broken neutral condition. A detected signal that exceeds a predetermined threshold causes an interruption of ground power servicing to the aircraft to prevent damage to sensitive instrumentation and electrical shock to passengers and crew.

Figures 1, 2:
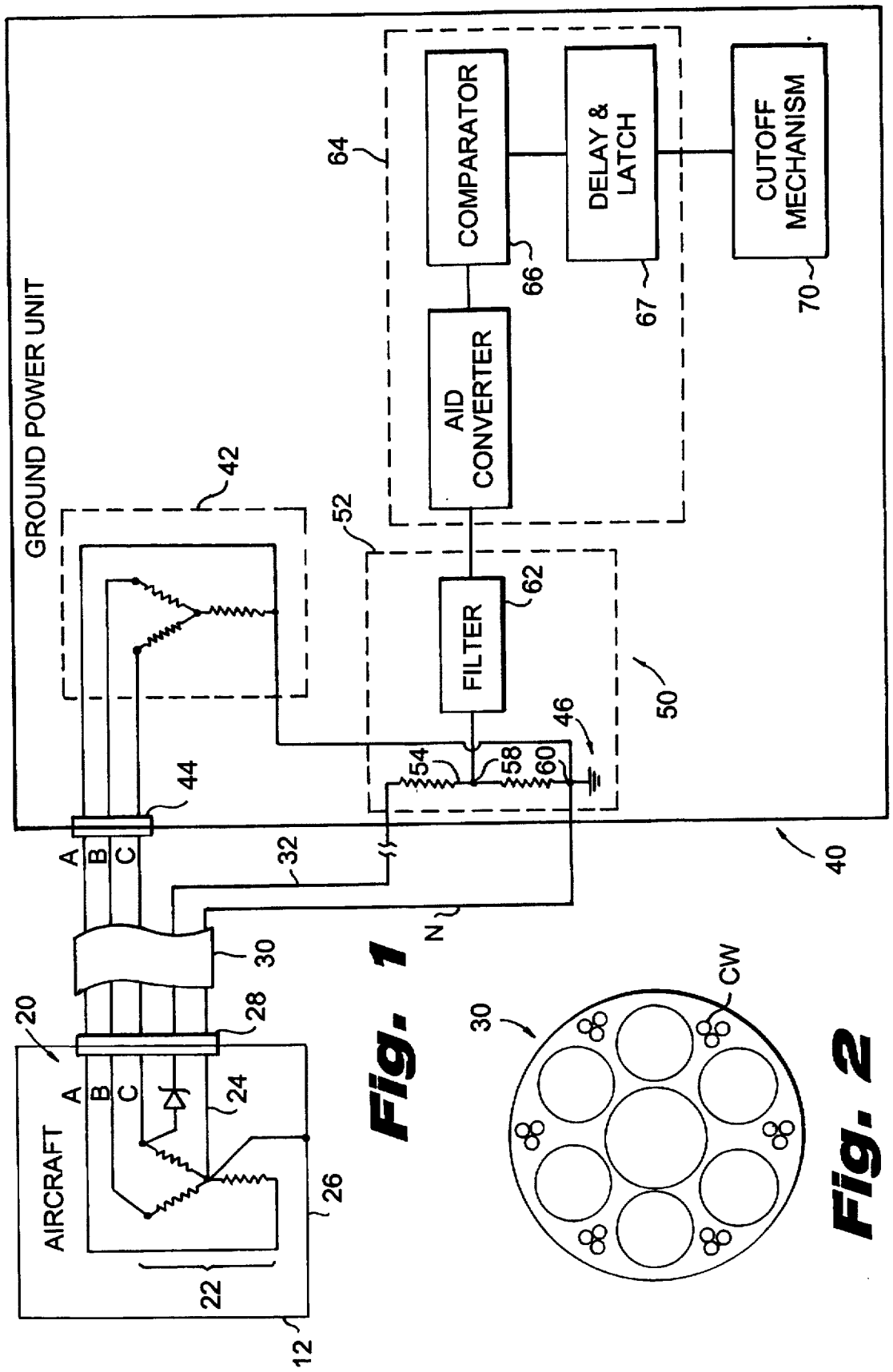
FIG. 1 is a block diagram of a ground power system according to one embodiment of the present invention.
FIG. 2 is a cross-sectional view of a power cable implemented in the system of FIG. 1.

Referring now to FIG. 1, a ground power system according to one embodiment of the present invention, generally designated 10, includes an aircraft power unit 20 disposed onboard an airplane 12 and coupled to a mobile ground power unit 40.

The aircraft power unit 20 generally includes an electrical distribution system networked throughout the aircraft to provide AC and DC power to a variety of loads ranging from delicate instrumentation to heavy-duty air conditioners and three-phase motors. The system is wired in a parallel arrangement to receive power either from onboard generators that tap into the aircraft propulsion system to provide electrical energy, or from the ground power unit 40. The loading of the aircraft electrical system may be represented by a wye-network 22 and having a neutral conductor 24 tied to the skin of the aircraft 26.

In order to receive power from the ground power unit 40, a plurality of main conductors A, B, C, and an extension of the neutral conductor N are routed to an accessible power cable connector 28 for coupling to a ground power harness 30 (FIG. 2). As an important feature of the present invention, a conductor 32 carrying rectified DC voltage from the aircraft power system is wired to the cable. The rectified voltage comprises a feedback voltage at the well known aircraft standard of 28 volts with respect to the neutral reference.

Referring now to FIG. 2, one example of the ground power cable 30 for coupling together the aircraft power system 20 and the ground power unit 40 includes respective pairs of conductors A, B, and C harnessed together for carrying the respective phase voltages for standard three-phase power. The pairs of conductors are disposed around the central neutral conductor N for carrying through the aircraft neutral point to the ground power unit. Respective groups of control wires CW carry control signals, such as the 28 volt feedback signal, to and from the aircraft.

With reference again to FIG. 1, the power cable 30 terminates at the ground power unit 40 to provide continuity of all the main conductors between the aircraft power system and the ground power unit, including the 28 volt feedback conductor 32 and the neutral conductor N.

The ground power unit 40 includes a power generator 42 capable of producing three-phase AC power. The unit is typically disposed on a mobile chassis (not shown) for precise positioning proximate a parked aircraft and includes a mating power connector 44 for coupling to the distal end of the power cable 30. The ground power unit's neutral reference point N is tied to earth ground 46.

Figure 3:
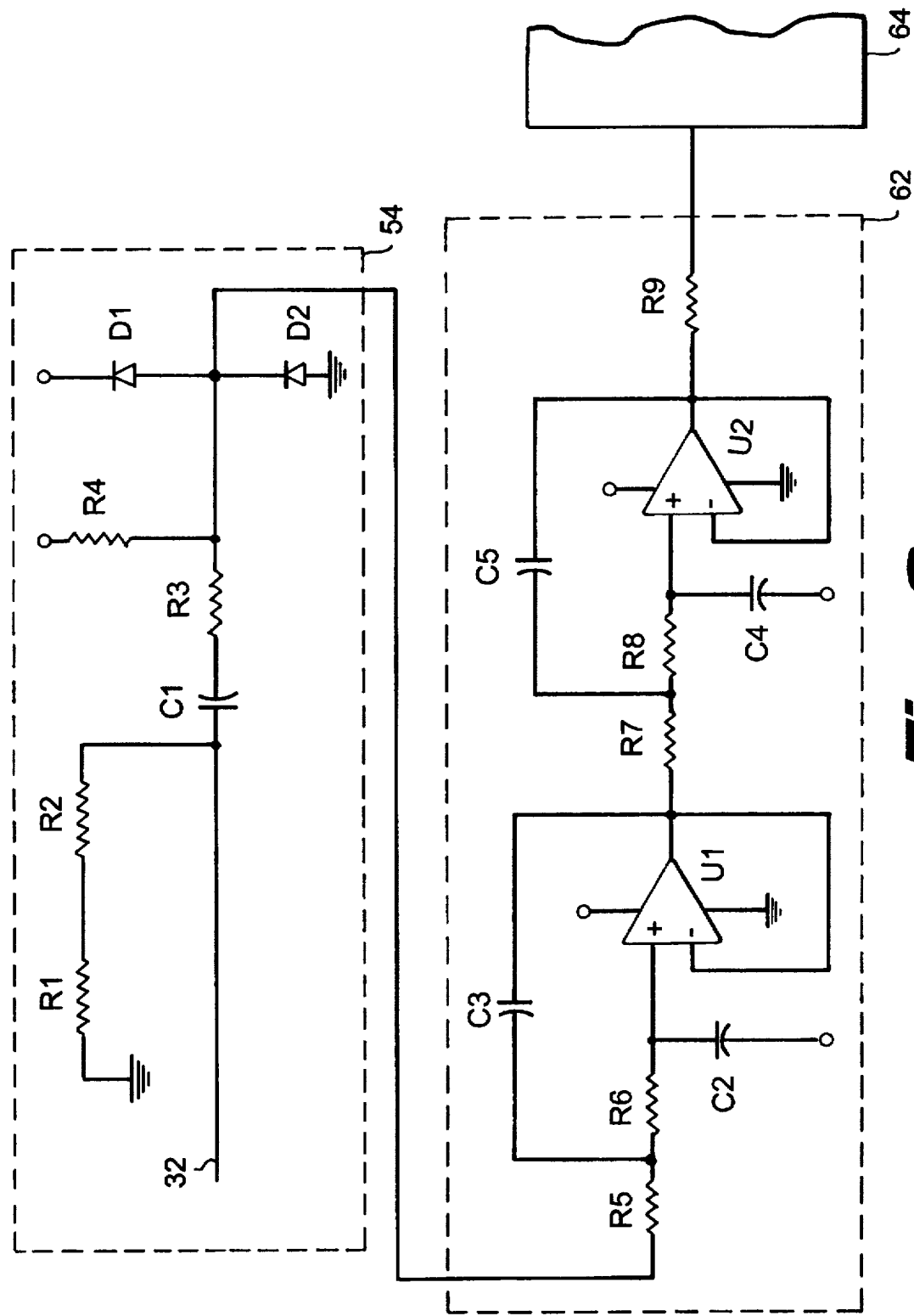
FIG. 3 is a partial schematic of one embodiment of the system shown in FIG. 1.
Figure 4:
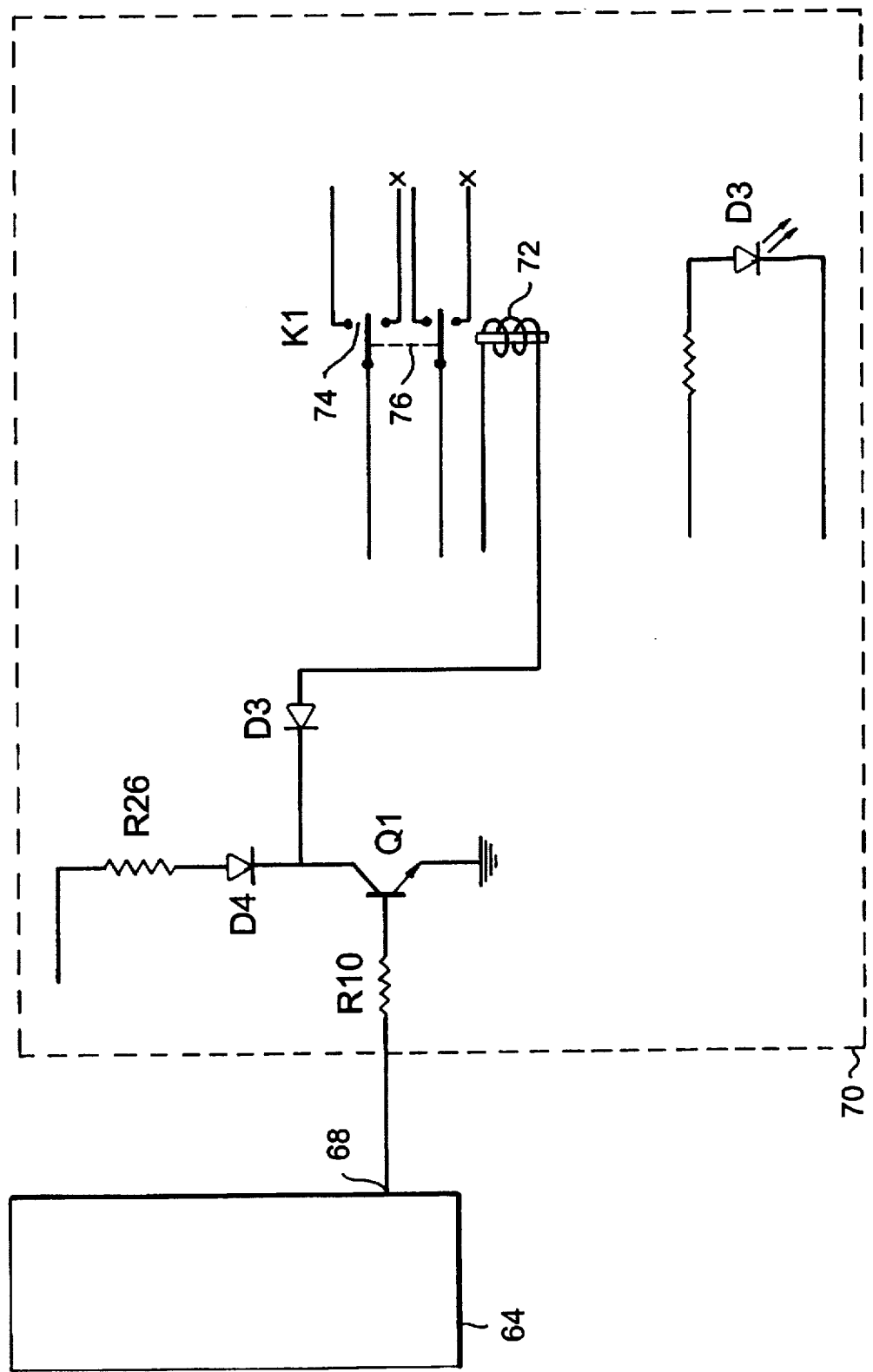
FIG. 4 is a partial schematic of one embodiment of the system shown in FIG. 1.

Referring now to FIGS. 1, 3, and 4, the ground power unit 40 supports circuitry for a ground fault and over-voltage detector, generally designated 50, for sensing the loss of the neutral reference conductor N coming back from the aircraft. The detector circuitry at the ground power unit is preferably implemented using discrete components mounted to a printed circuit board (not shown) and includes a signal conditioner 52 to modify the detected voltage signal, a comparator 66 to compare the detected signal against a predetermined threshold, and a cutoff mechanism 70 to interrupt power to the aircraft should the detected signal be greater than the acceptable threshold for more than a predetermined duration. The signal conditioner, in one embodiment, comprises an attenuator 54, and a filter 62, to effect signal processing for the comparator.

With particular reference to FIG. 3, one preferred embodiment for the attenuator 54 comprises a plurality of discrete elements including resistors R1 - R4, capacitor C1, and a pair of reverse-biased diodes D1 and D2. The components are collectively configured to define a voltage divider network to receive the input feedback voltage from the aircraft power system, at 58, and reduce the voltage to a manageable level. An important feature of the input network is the neutral reference to earth ground, at 60, which causes a potential difference to develop between the respective neutrals should the neutral connection N become damaged or lost altogether. Further, the voltage divider network also performs a high pass filter function, removing the 28 VDC normally present on the input signal. The cutoff frequency is in the range of approximately 10 to 50 Hertz.

Further referring to FIG. 3, the output of the attenuator 54 feeds the filter 62 realized in one embodiment as a dual stage low-pass configuration. The filter includes a first stage comprising op amp U1 with an input RC network comprising input resistors R5 and R6 disposed in parallel with capacitor C2. Positive feedback to the op amp is provided by capacitor C3 which cooperates with the input RC network to establish a first part of the overall filter transfer function. The second stage is cascaded with the first stage and includes op amp U2, resistors R7–R9 and capacitors C4 and C5 together configured similar to the first stage. This classic analog Butterworth design produces minimal ripple in the pass band, approximately 400 Hertz, and attenuates unwanted frequencies outside the band.

Referring now to FIGS. 1 and 4, the comparator 66, according to one embodiment, is implemented in a processor 64 having a memory (not shown) to receive the filtered output from the filter 62 and generate a digital representation of the signal for comparison to a predetermined threshold. The threshold represents the maximum allowable level of ground fault voltage on the power system and is programmed into a table stored in the processor memory for extraction during the comparison process. The processor is responsive to software comparison instructions to perform the comparison function and to detect any threshold crossings. Delay instructions included in the software also direct the processor to operate as a delay and latching mechanism 67 to generate an interrupt signal, at 68, to the cutoff mechanism 70 only after a delay of a predetermined duration.

The cutoff mechanism 70 comprises an active switch including input resistor R10 which cooperates with the interrupt voltage signal to generate base current to drive transistor Q1. Disposed at the collector of transistor Q1 is a diode D3 tied to the coil 72 of relay K1 to change the state of respective relay contacts 74 and 76 once collector current flows through transistor Q1. The relay communicates with a fault lamp (not shown) and a high power contractor (not shown) having respective on and off states corresponding to power being supplied or shut off to the aircraft from the ground power unit.

Assembly and manufacture of the ground fault and over-voltage detector is accomplished pursuant to processes well known to those skilled in the art. We have found the invention particularly adaptable to implementation on existing printed circuit boards included in conventional ground power units. This after-market OEM feature eliminates the necessity of requiring a separate circuit board for conventional units already in the field.

In operation, the ground fault and over-voltage detector 50 of the present invention monitors the level of ground fault voltage in the ground power system 10. Under normal conditions, the coupling of the ground power harness 30 completes continuity between the aircraft power unit 20 and the ground power unit 40. The neutral reference of the aircraft (FIG. 1, the aircraft skin 26) is thereupon tied to the ground power unit's neutral reference point (FIG. 1, earth ground 46). With a continuous neutral reference voltage, aircraft loads are maintained in a balanced state and the possibility for unexpected shock from touching the aircraft skin is minimized.

During normal operation, the unbalanced current from the aircraft's unbalanced loads, flows through the aircraft's neutral point and back to the ground. Should the neutral reference point from the aircraft become lost, as by wire fatigue or the like, the unbalanced current flows back through the other loads, thereby shifting the neutral reference voltage on the aircraft. Because the neutral voltage at the ground power unit remains constant, any shift in the aircraft neutral causes a ground fault voltage between the two neutrals. This voltage appears as an AC ground fault component superimposed on the 28 volt DC feedback signal conductor, referenced to the aircraft neutral 26, when sensed by the ground power unit having its neutral referenced to earth ground 46.

Detection of the feedback voltage begins at the attenuator 54 which divides the 28 volt signal down to a manageable level of less than 5 volts DC. The attenuated signal is then fed to the filter 62, which passes a narrow band of AC voltage of approximately 400 Hertz, corresponding to the frequency of any expected ground fault voltage component. The 400 Hertz signal is then fed to the signal input of the processor 64 for signal conversion and comparison.

The processor 64 converts the ground fault signal into a digital number by utilizing an analog-to-digital conversion technique well known to those skilled in the art. The digital number is then compared by the software implemented comparator 66 against one or more predetermined digital threshold levels pre-programmed into the memory. The threshold levels represent maximum allowable magnitudes of ground fault voltage.

If the threshold is exceeded, the software implemented delay mechanism 67 delays any interruption in power for a predetermined duration, on the order of 150 milliseconds. During the delay period, monitoring continues. Should the ground fault condition persist beyond the duration, the software directs the processor 64 to emit an interrupt signal. Otherwise, the ground fault is considered an anomaly, and normal operation continues.

Once the interrupt signal is generated, indicating a ground fault condition, it is fed to the base of transistor Q1, turning the transistor on and producing collector current through Q1, light emitting diode D4 and diode D5. The current draw completes a ground path and actuates relay K1 to change the state of the ground power unit contractor (not shown) and illuminate the fault lamp on the control panel. Tripping the contractor shuts the ground power off before any potentially damaging consequences result from the ground fault.

Those skilled in the art will appreciate the many benefits and advantages afforded by the present invention. Of significant importance is the feedback feature which enables the ground power unit to sense the ground fault voltage experienced at the aircraft. By sensing such a condition within a relatively high response time, significant costs resulting from inspection and possible replacement of precision instrumentation is avoided. Moreover, unexpected shocks to passengers and personnel are avoided by having the capability of shutting down the ground power unit within milliseconds of sensing the ground fault. This also protects against potential damage to the skin of the aircraft, which serves as the neutral reference for the aircraft, and therefore susceptible to carrying current should ground fault conditions arise.

While the invention has been particularly shown and described with reference to the preferred embodiments thereof, it will be understood by those skilled in the art that various changes in form and detail may be made therein without departing from the spirit and scope of the invention.

What is claimed is:

1. A ground fault and over-voltage detector for sensing a loss of neutral continuity between the respective neutral conductors of a power unit coupled to a remote apparatus by a plurality of main power conductors and a neutral conductor, said detector including:

a feedback path for carrying a feedback signal from said remote apparatus to said power unit, said feedback signal having a voltage referenced to and different from said remote apparatus neutral and having a ground fault voltage component;

a signal conditioner disposed in said power unit for receiving said feedback signal and generating a signal representative of a preselected characteristic of said ground fault voltage component;

a comparator connected to the output of said signal conditioner for contrasting said ground fault voltage characteristic signal to a predetermined baseline; and a cutoff mechanism responsive to said comparator, when said ground fault voltage is greater than said threshold, to interrupt power from said power unit to said remote apparatus.

2. A ground fault and over-voltage detector according to claim 1 wherein said feedback signal comprises:

a DC voltage from said remote apparatus.

3. A ground fault and over-voltage detector according to claim 1 wherein said cutoff mechanism includes a timer to delay interruption of said power for a predetermined duration following when said ground fault voltage is greater than said threshold.

4. A ground fault and over-voltage detector according to claim 1, wherein said remote apparatus comprises an aircraft power system.

5. A ground fault and over-voltage detector according to claim 1 wherein said signal conditioner includes an input attenuator for reducing said feedback voltage.

6. A ground fault and over-voltage detector according to claim 5 wherein said input attenuator comprises a voltage divider.

7. A ground fault and over-voltage detector according to claim 1 wherein said signal conditioner includes a filter to remove unwanted signal frequencies.

8. A ground fault and over-voltage detector according to claim 7 wherein said filter comprises a dual Butterworth bandpass filter having a center frequency of approximately 400 hertz.

9. A power system for servicing a remote apparatus, said power system including:

a power distribution unit having respective loads referenced to a neutral voltage and including a feedback path for transmitting a feedback signal referenced to and different from said neutral voltage, said feedback signal having a ground fault voltage component; and a power unit having a ground fault and over-voltage detector, said detector including a signal conditioner disposed in said power unit for receiving said feedback signal and generating a signal representative of the magnitude of said ground fault voltage component;

a comparator connected to the output of said signal conditioner for contrasting said ground fault voltage magnitude signal to a predetermined threshold; and a cutoff mechanism responsive to said comparator, when said ground fault voltage is greater than said threshold, to interrupt power from said power unit to said remote apparatus.

10. A power system according to claim 9 wherein said feedback signal comprises:

a DC voltage from said remote apparatus.

11. A ground power system according to claim 9 wherein said cutoff mechanism includes a timer to delay interruption of said power for a predetermined duration following when said ground fault voltage is greater than said threshold.

12. A power system according to claim 9, wherein said remote apparatus comprises an aircraft.

13. A ground power system according to claim 9 wherein said signal conditioner includes an input attenuator for reducing said feedback voltage.

14. A ground power system according to claim 13 wherein said input attenuator comprises a voltage divider.

15. A ground power system according to claim 9 wherein said signal conditioner includes a filter to remove unwanted signal frequencies.

16. A ground power system according to claim 15 wherein said filter comprises a dual Butterworth bandpass filter having a center frequency of approximately 400 hertz.

17. A method of detecting discontinuity between respective discontinuous neutral reference points in a power unit and a remote apparatus during power servicing of said remote apparatus by said power unit, said method including the steps of:

generating a predetermined feedback voltage at said remote apparatus, said feedback voltage referenced to and different from said remote apparatus neutral reference point and including a ground fault voltage component indicative of the voltage between said respective discontinuous neutral reference points;

sensing said feedback voltage at said power unit;

comparing the magnitude of said fault component to a predetermined threshold magnitude; and interrupting, when the magnitude of said ground fault component is greater than said predetermined threshold, the servicing of power to said remote apparatus.

18. A method according to claim 17 wherein said comparing step comprises:

establishing a digital threshold representation of said predetermined threshold;

converting said passed band into a digital representation of the magnitude of said feedback voltage; and determining whether said digital threshold is greater than said digital feedback representation.

19. A method according to claim 17 wherein said step of interrupting includes:

delaying, when the magnitude of said AC component is greater than said predetermined threshold, any change of said for said power servicing for a predetermined duration; and terminating power to said remote apparatus from said power unit if said threshold remains exceeded after said timed duration.

20. A method according to claim 17, wherein said remote apparatus comprises an aircraft.

21. A method according to claim 17 wherein said generating step includes the steps of:

receiving AC voltage at said remote apparatus from said power unit; and rectifying said received AC voltage to produce a rectified signal having a DC voltage with an AC ground fault component.

22. A method according to claim 21 wherein said sensing step includes:

carrying said rectified feedback signal from said remote apparatus to said power unit; and determining the relative magnitude of said ground fault voltage component.

23. A method according to claim 22 wherein said determining step includes the step of conditioning said sensed feedback voltage.

24. A method according to claim 23 wherein said conditioning step includes the steps of:

attenuating said feedback signal; and filtering the DC component from said signal; and filtering high frequency artifacts introduced during said step of rectifying.

25. A method according to claim 24 wherein said filtering step includes:

passing a band of AC frequencies corresponding to said ground fault voltage.

* * * * *